Figure 1:
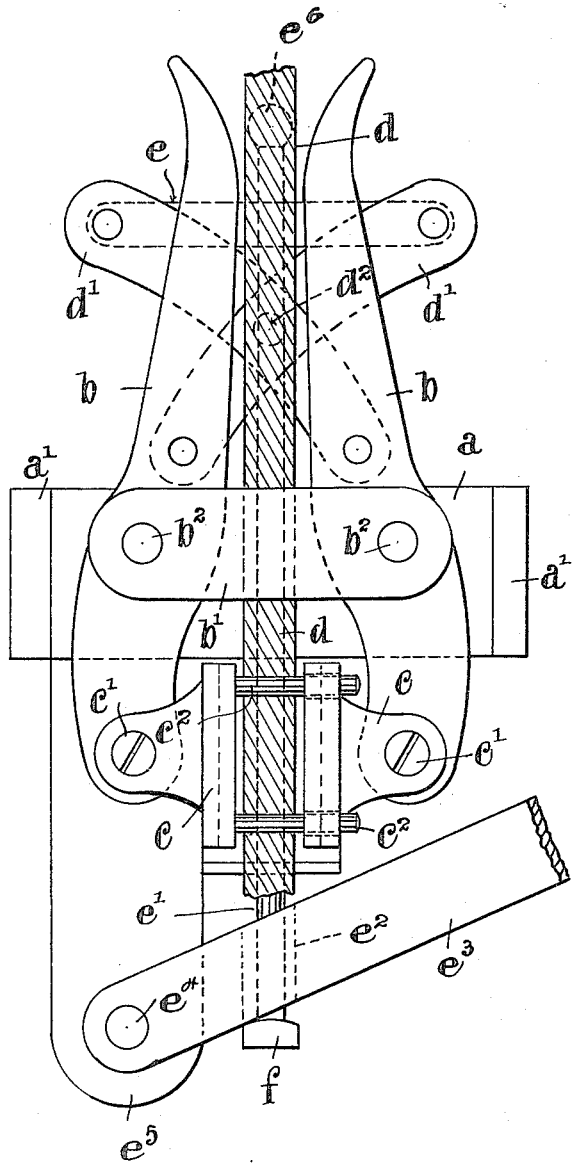

J. YATES & C. HEYES.
SAFETY DEVICE OR ARRESTER FOR COLLIERY WINDING CAGES, HOISTS, AND THE LIKE.
APPLICATION FILED DEC. 30, 1913.

1,127,713.

Patented Feb. 9, 1915.
12 SHEETS—SHEET 1.

WITNESSES:
John C. Sanders
Albert F. Henman

INVENTORS:
Jack Yates
Charles Heyes
By Wm. Wallace White
ATTY.

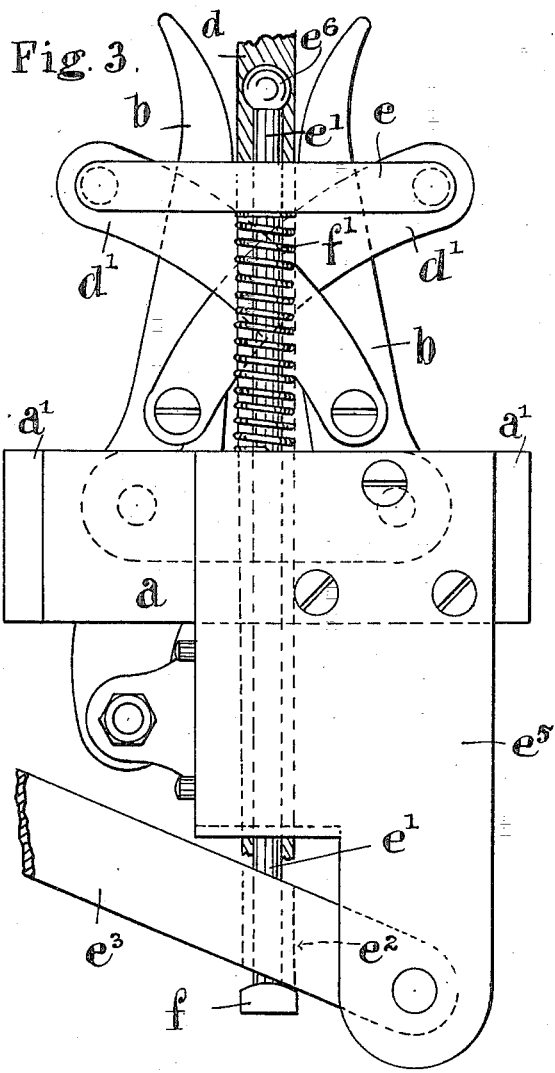
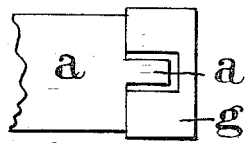
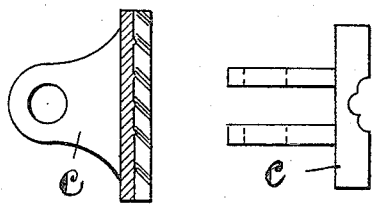
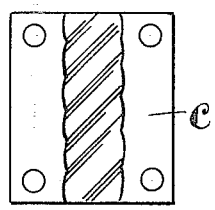
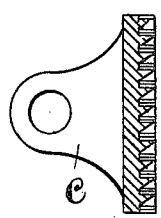
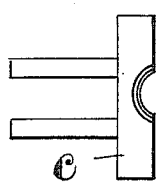
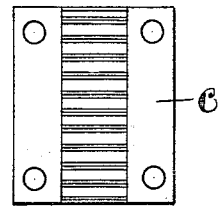

J. YATES & C. HEYES.
SAFETY DEVICE OR ARRESTER FOR COLLIERY WINDING CAGES, HOISTS, AND THE LIKE.
APPLICATION FILED DEC. 30, 1913.

1,127,713.

Patented Feb. 9, 1915.
12 SHEETS—SHEET 4.

J. YATES & C. HEYES.
SAFETY DEVICE OR ARRESTER FOR COLLIERY WINDING CAGES, HOISTS, AND THE LIKE.
APPLICATION FILED DEC. 30, 1913.

1,127,713.

Patented Feb. 9, 1915.

12 SHEETS—SHEET 9.

WITNESSES:
John C. Sanders
Albert F. Newman

INVENTORS:
Jack Yates
Charles Heyes
By M. Wallace White
ATT'Y

J. YATES & C. HEYES.
SAFETY DEVICE OR ARRESTER FOR COLLIERY WINDING CAGES, HOISTS, AND THE LIKE.
APPLICATION FILED DEC. 30, 1913.

1,127,713. Patented Feb. 9, 1915.
12 SHEETS—SHEET 10.

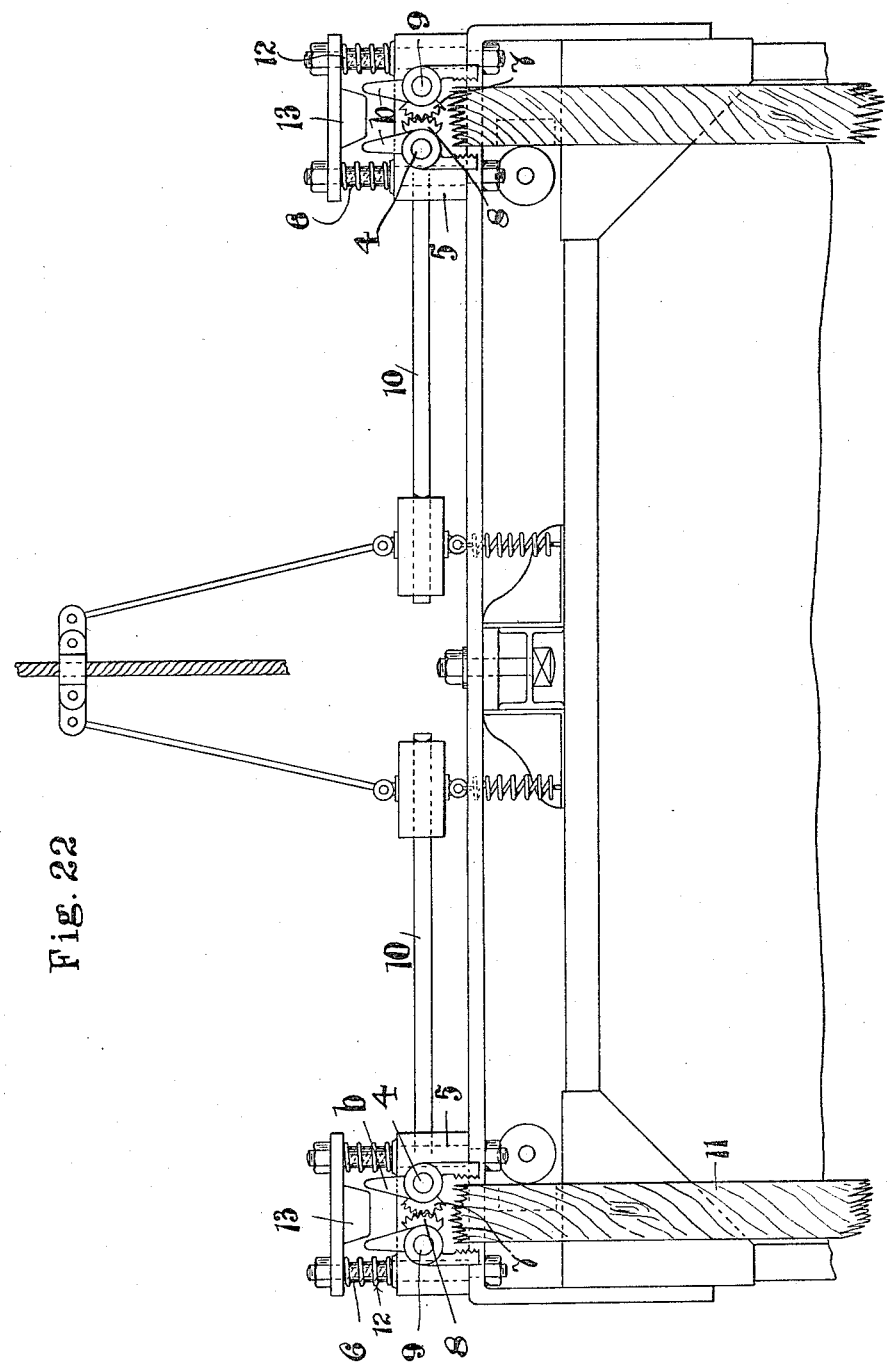

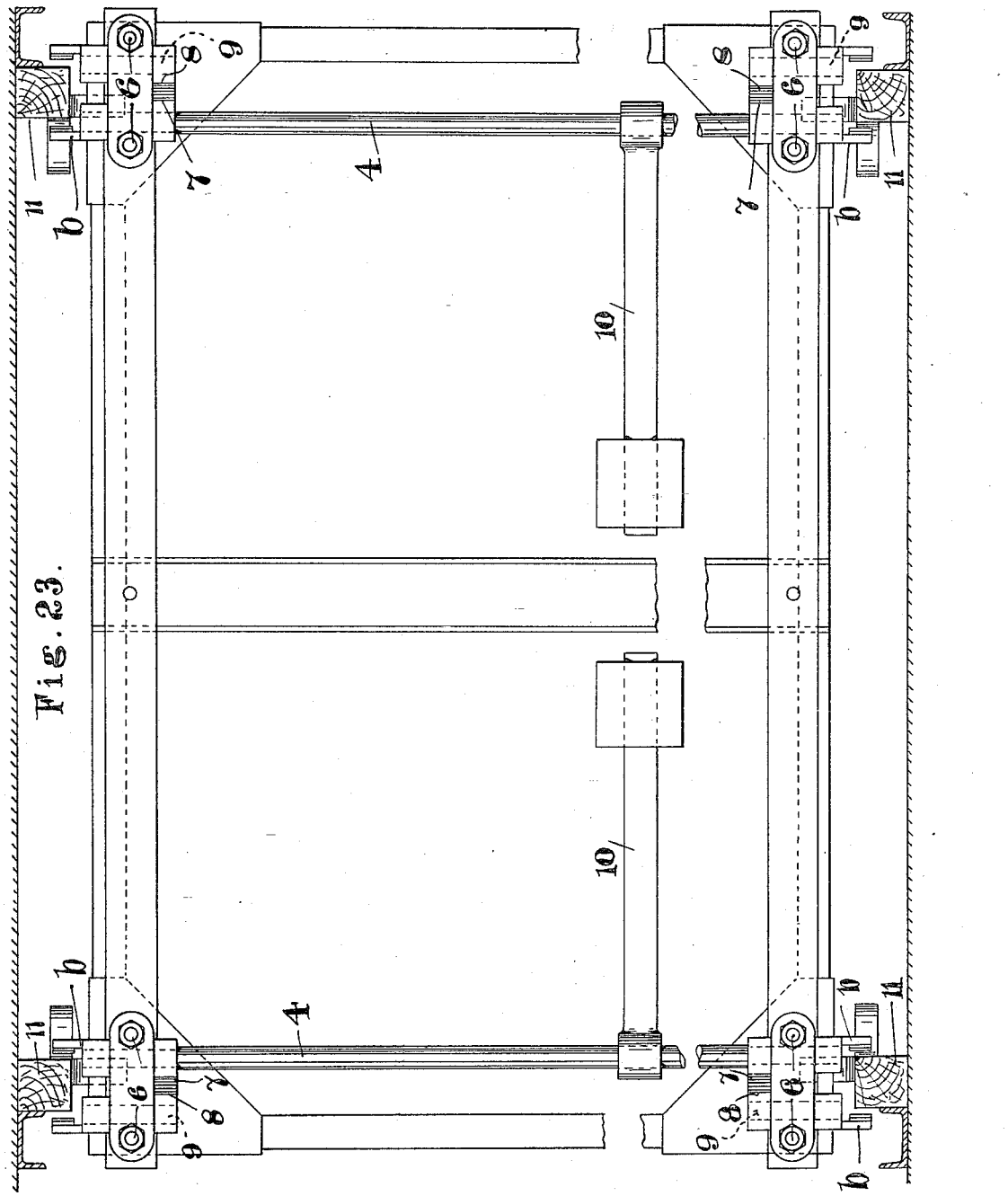

UNITED STATES PATENT OFFICE.

JACK YATES AND CHARLES HEYES, OF ST. HELENS, ENGLAND.

SAFETY DEVICE OR ARRESTER FOR COLLIERY WINDING-CAGES, HOISTS, AND THE LIKE.

1,127,713.

Specification of Letters Patent.

Patented Feb. 9, 1915.

Application filed December 30, 1913. Serial No. 809,465.

*To all whom it may concern:*

Be it known that we, JACK YATES and CHARLES HEYES, subjects of the King of Great Britain and Ireland, residing, respectively, at 13 Joseph street, Sutton, St. Helens, in the county of Lancaster, England, and the Locomotive Inn, Sutton aforesaid, have invented new and useful Improvements in Safety Devices or Arresters for Colliery Winding-Cages, Hoists, and the like, of which the following is a specification.

The invention relates to safety devices or arresters for colliery winding cages, hoists and the like.

It consists of a gripping appliance for the conducting rods of the cage, which appliance travels with the cage but is not secured thereto. On the breakage of the winding rope or suspension chains of the cage, a spring or load, or both combined, is or are arranged to cause the appliances or arresters to grip the conducting rods and to be held thereto, the cage being free to descend to a very slight extent when a shoe, wedge or suitable part carried by the cage acts upon the arresters and by the whole weight of the cage and contents, causes the appliances to exert such a powerful and irresistible grip upon the conducting rods that the cage is brought to a standstill almost simultaneously with the breakage of the rope or chains, and the cage is securely held gripped to the conducting rods.

An important feature of the invention consists in the provision of means whereby the usual amount of slack in the rope or chains which always occurs at intervals in the normal working of the cage causes no effect upon the gripping devices or arresters, which then do not act upon the conducting rods, but are only brought into action by the actual failure in the haulage means. Thus there is no liability of the safety appliances gripping the conducting rods unless in case of actual necessity, preventing liability of injury to such rods.

Figure 2:
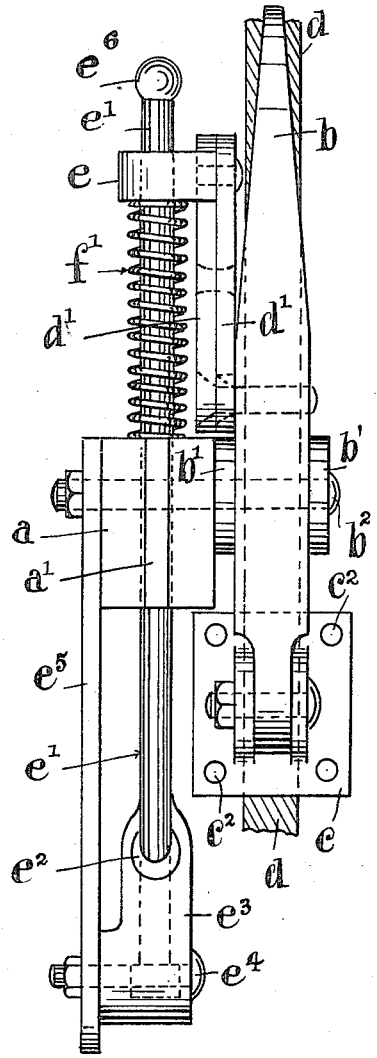
Figure 11:
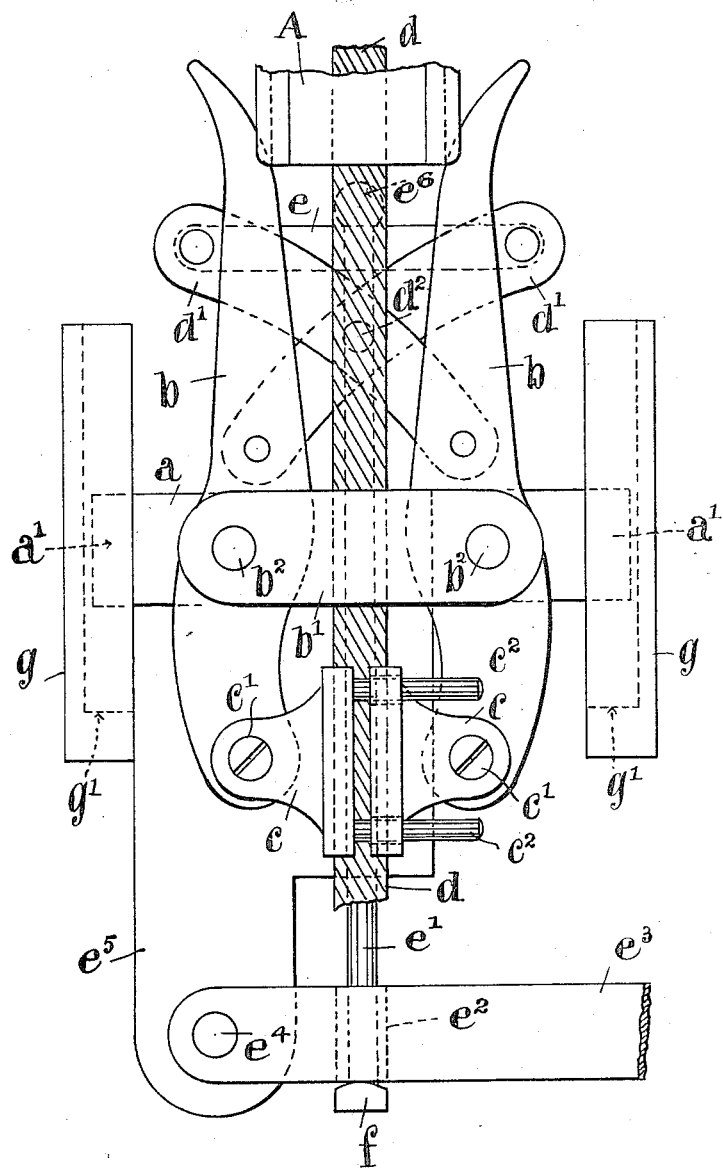
Figure 12:
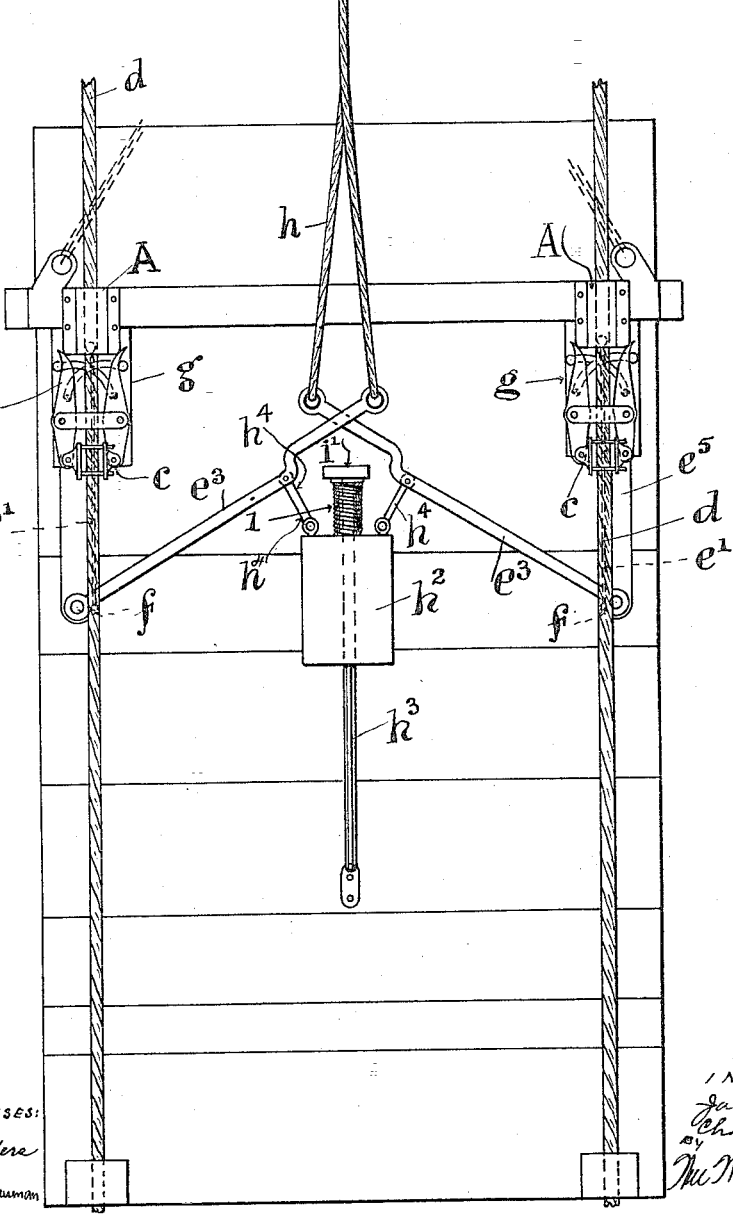
Figure 13:
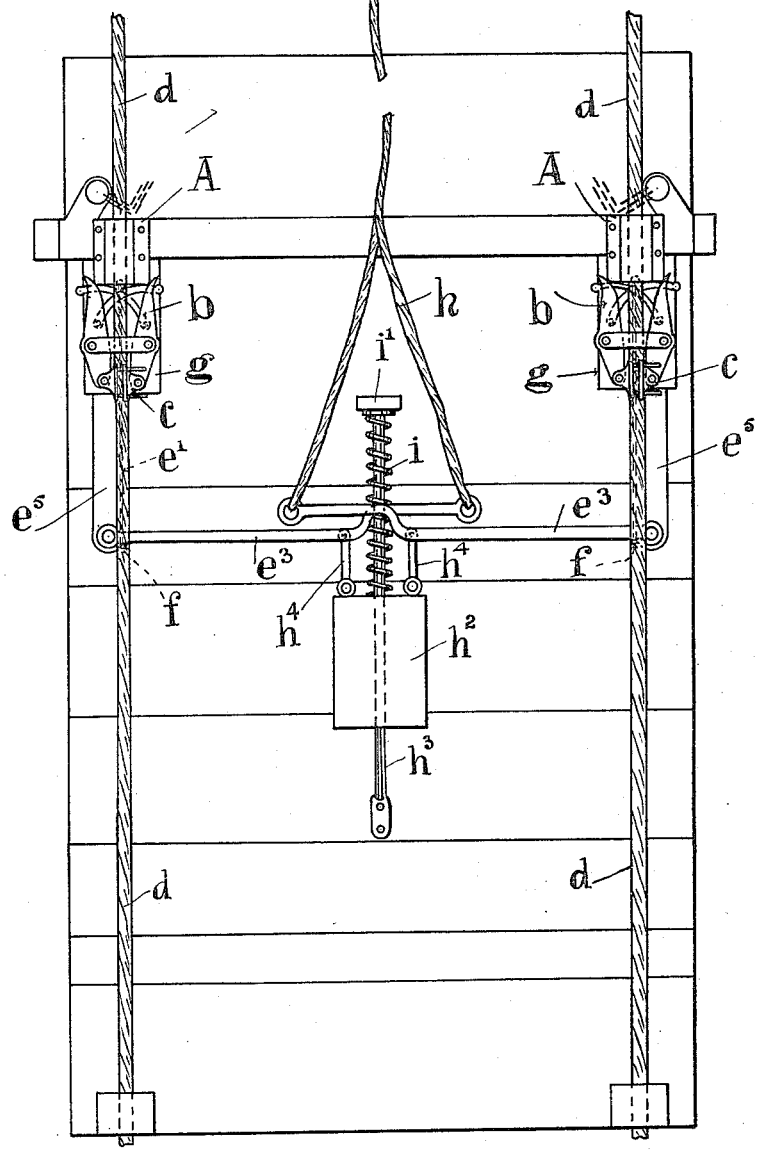
Figure 14:
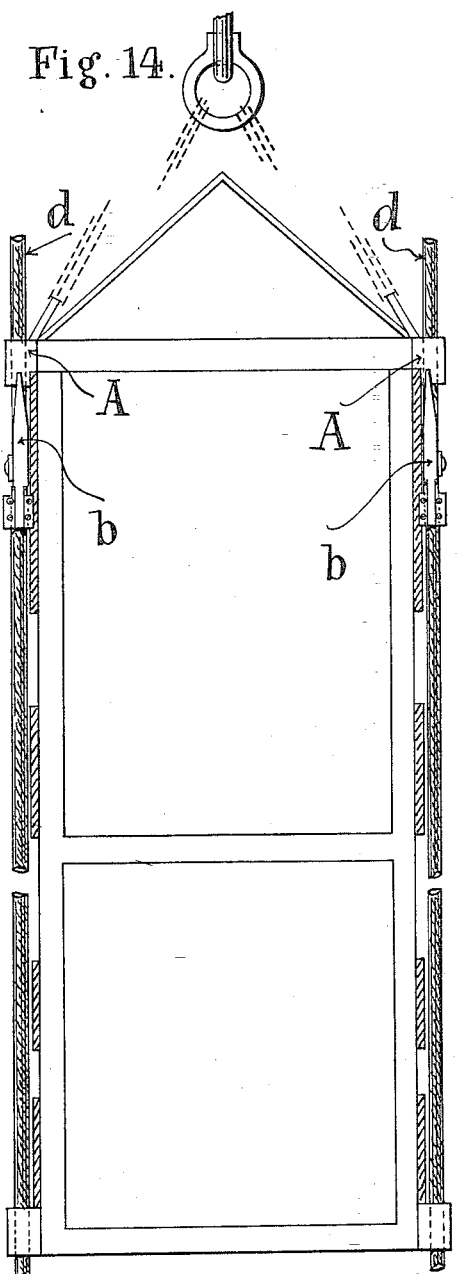
Figure 15:
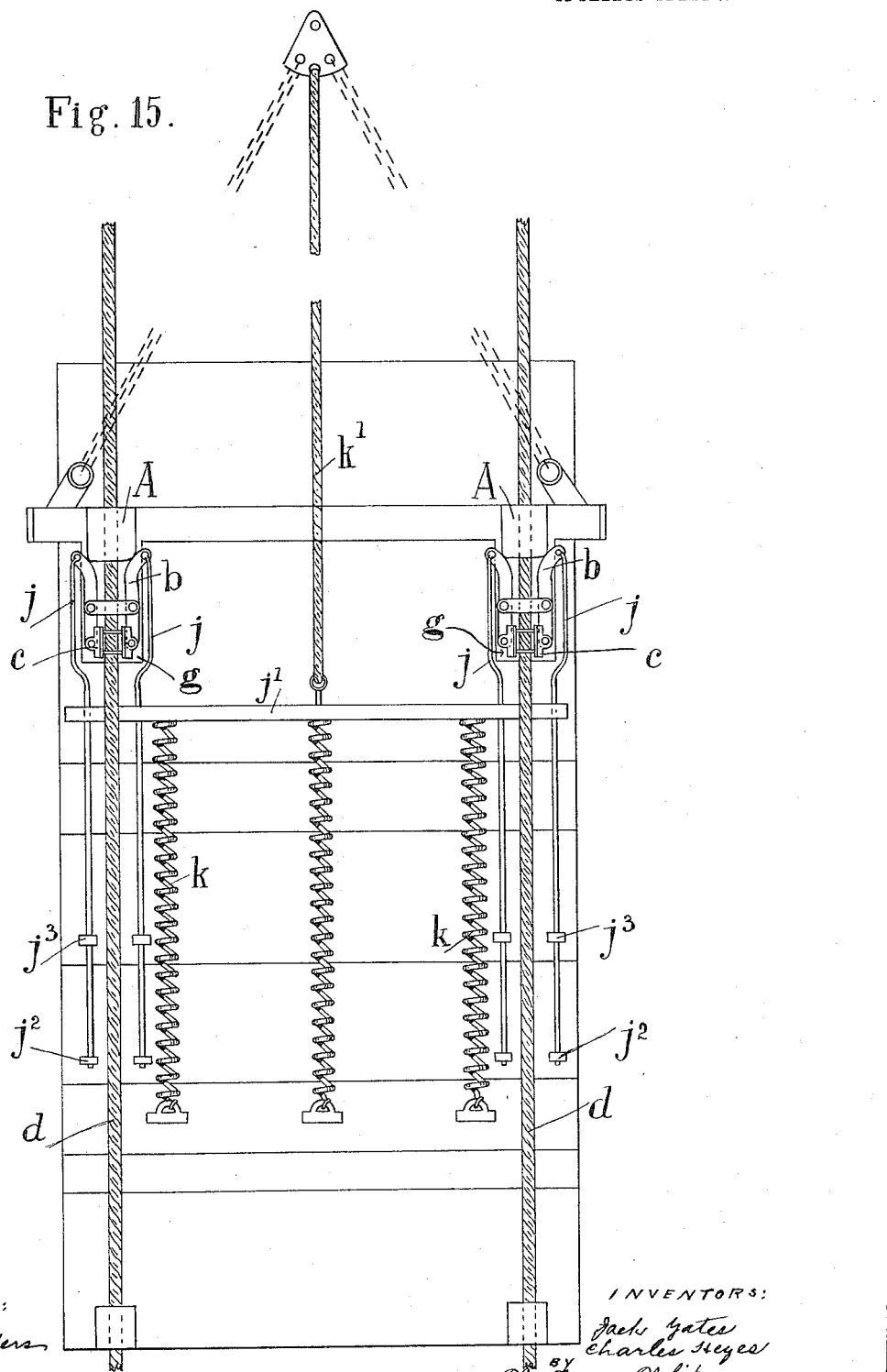
Figure 16:
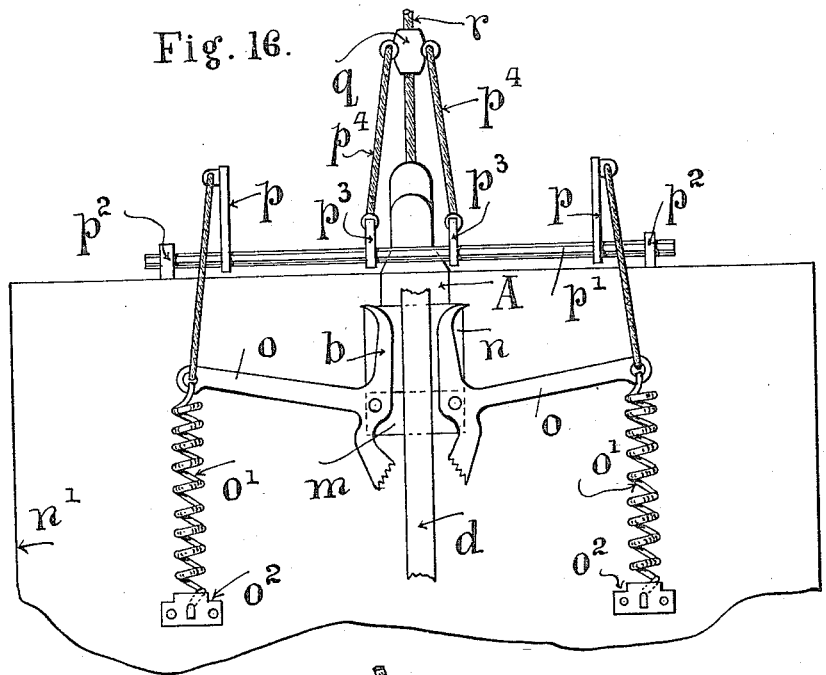
Figure 17:
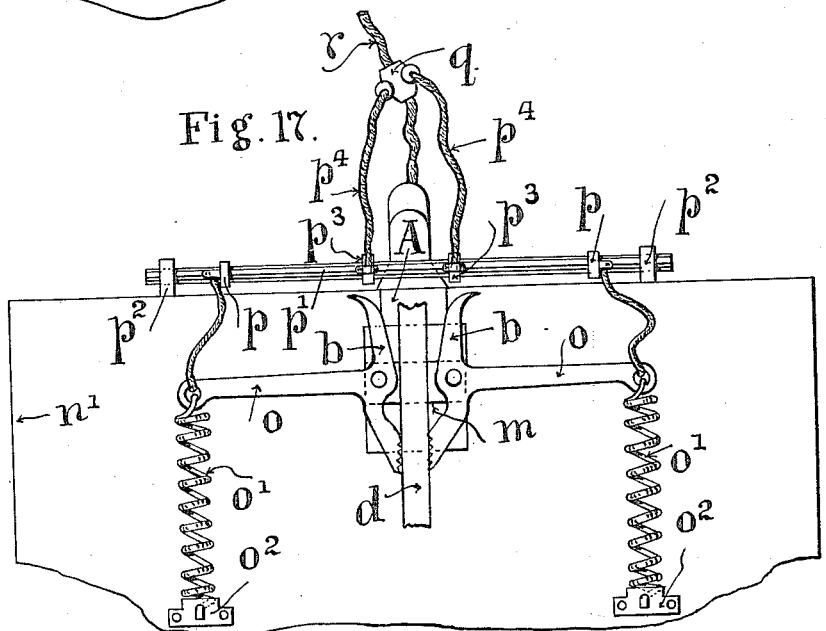

In the accompanying drawings, Figure 1 is a face view of a gripping appliance, made in accordance with the invention and out of action. Fig. 2 is an end view thereof. Fig. 3 illustrates the appliance from the opposite side of Fig. 1. Figs. 4 to 10 are detail views which will be referred to in the following description. Fig. 11 shows the appliance in action gripping the conducting rod. Fig. 12 shows the appliances applied to a winding cage, out of action, and the controlling means for the device. Fig. 13 is a view similar to Fig. 12 with the appliances in action to arrest the cage owing to the breakage of the winding rope. Fig. 14 is an end view of the cage showing the arresters applied thereto. Fig. 15 indicates a modified means of controlling the arresters. Figs. 16 and 17 show how the invention may be applied to hoists. Figs. 18 to 23 show modifications of the invention.

We will first describe a convenient form of the gripping appliance or arrester which may be made to any desired size, and is illustrated in Figs. 1 to 11.

The construction embodies a cross head $a$ having reduced end pieces $a'$, and a pair of levers $b, b$ connected together by a link $b'$ at each side thereof and pivoted at $b^2$ to the cross head $a$. The lower ends of these levers $b$ are provided with grippers $c, c$ pivoted to the levers at $c'$, arranged one at each side of the conducting rod $d$. These grippers are guided toward and from each other in a straight line by rods or bars $c^2$ secured to one of the grippers and passing loosely through holes in the other gripper. Behind the levers $b$ are a pair of crossed links $d'$, pivoted together at $d^2$ and at their lower ends to the levers $b$, the upper ends being pivoted to a cross bar $e$. A rod $e'$ is slidable through the bar $e$ and the head $a$, the end of the rod passing through a slot $e^2$ in a lever $e^3$ fulcrumed at $e^4$ on to a plate $e^5$ secured to the cross head $a$. The lever $e^3$ rests upon a nut or enlargement $f$, on the lower end of the rod $e'$, the upper end of the rod $e'$ having also a head $e^6$ thereon extending normally well above the cross bar $e$. The means for actuating the rod $e'$ from the lever $e^3$ may be varied. A spring $f'$ is coiled around the rod $e'$ between the bar $e$ and the cross head $a$. It is possible for the rod $e$ to be pulled down some distance by the lever $e^3$ without affecting the levers $b$, but should the rod $e'$ be pulled down so far as to bring the head $e^6$ to bear against and lower the cross bar $e$, compressing the spring $f$, the crossed links $d$ would be slightly compressed thrusting the upper ends of the levers $b$ outward and causing the grippers $c$ to bind on to the conducting rod $d$. If the upper ends of the levers $b$ are then thrust farther apart by a descending body an enormous gripping force can be exerted by the gripping blocks on to the conducting rod $d$. When the actuating force is removed the spring $f'$ returns the parts to their normal position. If the conducting rods are spirally wound wire ropes, as are usually employed, the hollowed out interior face of each block may be fashioned to a corresponding spiral as shown in sectional elevation of one of the grippers in Fig. 5, in plan view in Fig. 6, and in front elevation in Fig. 7. If plain metal conducting rods are used the interior hollowed face of the grippers may be milled to provide suitable teeth to afford a grip on to the smooth rod as shown on one of the grippers in sectional elevation in Fig. 8, plan view in Fig. 9 and face view in Fig. 10. The details of construction of the safety appliance or arrester as illustrated in Figs. 1 to 11 may be varied. The controlling means employed for pulling down the rod $e'$ on the breakage of the winding rope or suspension chains may be greatly modified but we have shown in the accompanying drawings certain methods of effecting this by way of example only.

Referring to Figs. 12 to 14 it will be seen that each conducting rod $d$ is provided with one of the improved arresters. These arresters are disposed loosely in slotted brackets $g$ secured to the cage, such brackets $g$ being shown in elevation in Fig. 11 and in plan in Fig. 4, the reduced extension $a'$ of the cross head $a$ being placed within and easily slidable in the slot in the bracket. The shoes A secured to the winding cage through which the conducting rods $d$ pass, are grooved at the sides and disposed between the upper curved ends of the levers $b$. When the cage is working under normal conditions the cross head $a$ rests upon the bottom $g'$ of the brackets $g$ and the appliances travel up and down with the cage. The levers $e^3$ of each safety appliance extend inward and are connected by cords $h$ to the chain attachment plate $h'$ to which the winding rope is secured and by links $h^4$ to a weight $h^2$. When the weight of the cage is borne by the winding rope the levers $e^3$ are raised, lifting the weight $h^2$ which is slidable on a rod $h^3$ secured to the cage, and compressing a spring $i$ coiled around the rod $h^3$ between the weight and a cap $i'$ on the rod. The levers $e^3$ may yield with the slack of the suspension chains to a considerable extent to meet any ordinary requirements without pulling down the rods $e'$ far enough to bring the safety device into action. In case of breakage of the winding rope or cage suspension chains, the load $h^2$ assisted by the spring $i$, would fall on the rod $h^3$ as shown in Fig. 13. The immediate effect of this would be to cause the levers $e^3$ to pull down the rods $e'$ sufficiently to cause the head $e^6$ of the rod to force down the cross bar $e$ and thus turn the levers $b$ on their fulcra and cause the gripping blocks $c$, $c$ to bind onto the conducting rod $d$ and secure the safety appliances to the conducting rods. As explained, the safety appliance is not secured rigidly to the cage but is slidable in the brackets $g$ carried by the cage. Immediately after the safety appliances have gripped the conducting rods $d$ the shoes A secured to the cage, in the descent of the cage, force outward the upper ends of the levers $b$ exerting the whole weight of the cage and contents, and so cause the grippers $c$, $c$ to become absolutely locked to the conducting rods $h$ arresting immediately the further descent of the cage.

A modification in the control of the safety appliances is illustrated in Fig. 15. In this case also the appliance is slidable in brackets $g$ attached to the cage. The levers $b$ carrying the gripping blocks $c$ at their lower ends are connected at their upper ends to rods $j$ which are slidable in a cross bar $j'$ and in brackets $j^2$ secured to the cage, the rods $j$ having collars $j^3$ thereon toward their lower ends. The cross bar $j'$ is connected to the cage by any suitable number of springs $k$ and also by a cord $k'$ to the suspension chain connection of the winding rope. When the weight of the cage is supported by the winding rope and the suspension chains are taut the parts are in the position shown in the drawings and the springs are in tension. In case of breakage however, the springs resile and draw down the cross bar $j'$ which slides on the rods until it comes into contact with the collars $j^3$ pulling down the rods $j$ causing the levers $b$ to turn on their fulcra and jamming the grippers $c$ onto the conducting rods $d$ to secure the safety appliances to the conducting rods. The continuing descent of the cage acts, through the shoes A, to thrust the ends of the levers $b$ farther apart as already explained to lock the appliances and the cage securely to the conducting rods $d$. It will be noticed that there is considerable play between the cross bar $j'$ and the collars $j^3$ on the rods $j$ to allow for slack chain during the ordinary working of the cage to prevent the safety devices from being prematurely brought into action.

Figs. 16 and 17 show the invention applied to a hoist with another method of control. The levers $b$ are formed at their lower ends with serrated faces to grip a flat sided conducting rod $d$, and are pivoted to a block $m$ slidable in a recess $n$ formed in the side of the hoist $n'$. The levers $b$ have arms $o$ attached thereto connected by springs $o'$ to fixings $o^2$ on the hoist. The levers $b$ are maintained out of action by cords attached to the arms $o$ and to levers $p$ on a rod $p'$ rotatable in bearings $p^2$ on the hoist. The rod $p'$ is provided with cranks $p^3$ $p^3$ connected by cords $p^4$ to a bracket $q$ on the winding rope $r$, which, so long as it remains unbroken and taut with the weight of the hoist, serves to maintain the safety device out of action as shown in Fig. 16. On the failure of the winding rope the springs $o'$ pull down the arms $o$ of the levers $b$ and cause the same to bind upon and become fixed to the conducting rod $d$ the shoe A on the hoist, on the further downward movement of the hoist thrusting outward the upper ends of the levers $b$ as shown in Fig. 17 thus securely jamming the hoist upon the conducting rods $d$.

Figure 18:
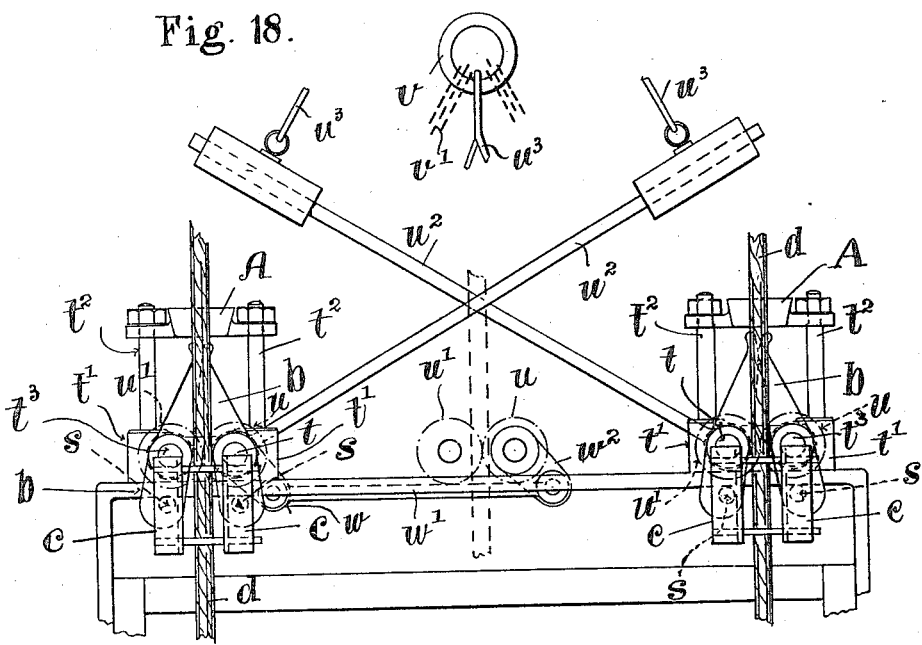
Figure 19:
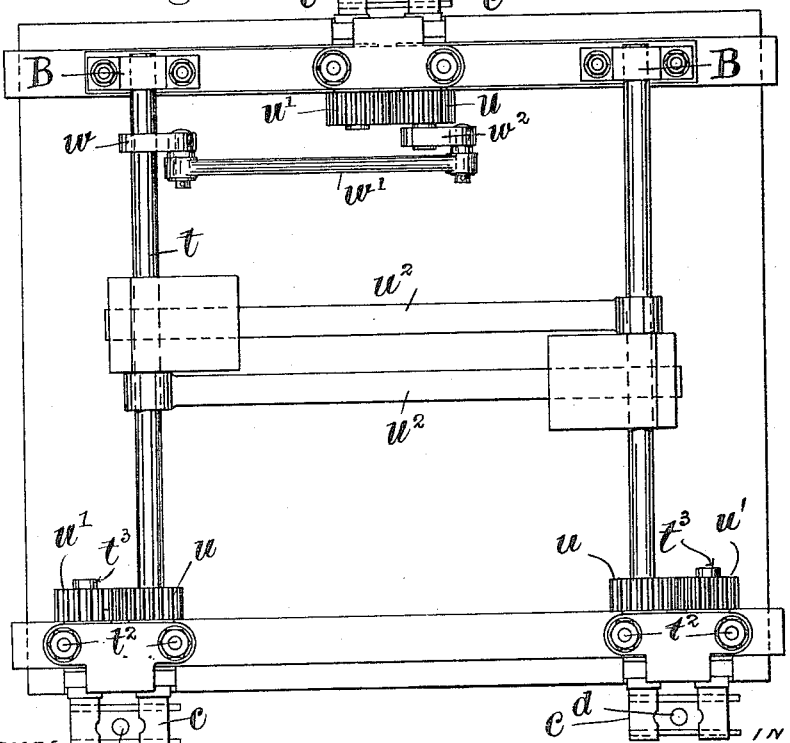

In the arrangement shown in elevation in Fig. 18 and in plan in Fig. 19, the gripping blocks are positively actuated by toothed gearing. The grippers $c$ are connected by studs $s$ to the lower ends of the levers $b$ one of which is mounted on a cross shaft $t$ one end of which is carried in a block $t'$ slidable on rods $t^2$. The other lever $b$ is carried on a spindle $t^3$ rotatable in the block $t'$. The cross shaft $t$ has a toothed pinion $u$ gearing with a similar toothed pinion $u'$ on the spindle $t^3$. The cross shafts $t$ carry loaded levers $u^2$ lifted during the normal working of the cage by means of cords or chains $u^3$ attached to the ring $v$ of the winding rope, to which the suspension chains $v'$ are secured. If the weighted levers fall due to breakage of the winding rope the shafts $t$ are rotated. Each of the gripper blocks $e$ is thus thrust toward the guide rod $d$ gripping the same, by the action of the toothed wheels $u$ $u'$ and the studs $s$ connecting the lower ends of the levers $b$ to the grippers $c$. The levers $b$ are thus opened outward at the top and the cage continuing to descend the shoes A thrust the upper ends of the levers $b$ farther apart and jam the grippers on to the conducting rods $d$ as already explained. The blocks $t'$ are slidable upon the rods $t^2$ allowing the cage to descend sufficiently to bring the shoes A into action as described. The bearings B of the cross shafts $t$ also have sufficient play or movement permitted to allow the cage to descend to a slight extent when the grippers have been bound to the conducting rods $d$ by the fall of the loaded levers $u^2$. During the ordinary working of the cage the loaded levers $u^2$ may sway to a certain extent along with the slack of the winding rope without binding the grippers $e$ to the guide rods $d$. Where a third guide rod $d$ is used, as shown in the plan view Fig. 19, a gripping device may also be applied to this third rod, similar to that described, the toothed gearing $u$ $u'$ being actuated by a crank $w$ on one of the cross shafts $t^0$ connected by a rod $w'$ to another crank $w^2$ on the axis of one of the levers through which the gripper blocks $c$ are operated.

Figure 20:
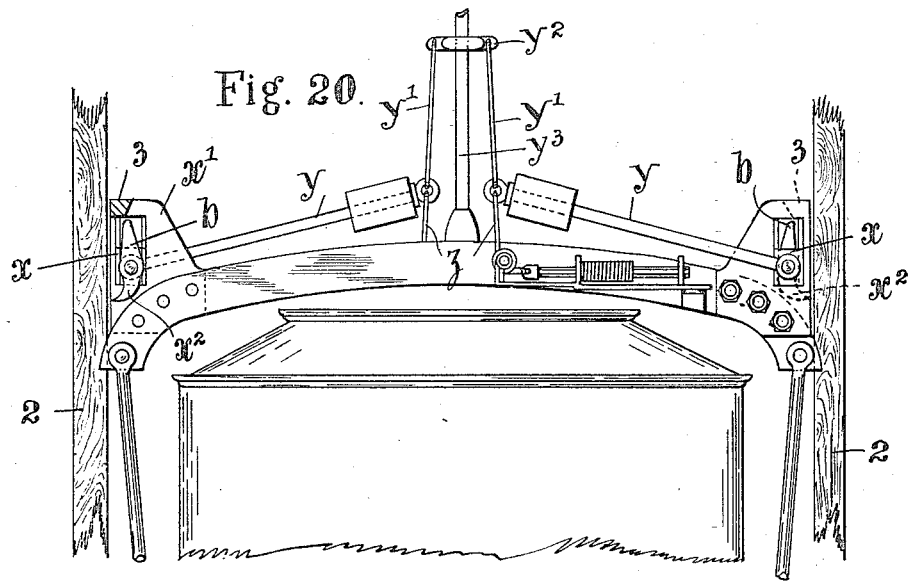
Figure 21:
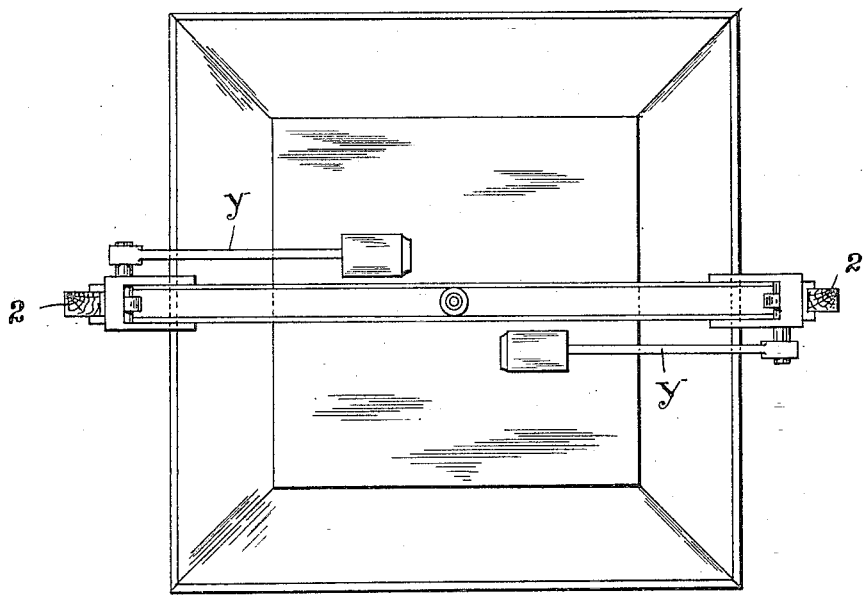

The arrangement shown in elevation in Fig. 20 and in plan view in Fig. 21 is suitable for a passenger lift. The levers $b$ are pivoted each to a block $x$ slidable in the brackets $x'$ and are formed with knife edges $x^2$. The loaded levers $y$ pivoted to the levers $b$ are normally raised by cords or chains $y'$ attached to a bracket $y^2$ on the winding rope $y^3$. In case of breakage of the winding rope and consequent breakage of the cords or chains $y'$ spring actuated cords $z$ assist in pulling down the loaded levers $y$ and cause the knife edge of the levers $b$ to dig into the wooden side conducting bars 2 of the lift and secure the gripping levers $b$ to the bars 2. On the further descent of the lift the wedge or part 3 acting on the upper part of the levers $b$ serves to force the knife edge of the levers $b$ farther into the wooden conducting bars 2 with the full weight of the lift so as to securely bind the lift to the bars 2 and arrest its descent.

Figs. 22 and 23 show in elevation and plan an arrangement applied to a passenger lift with four corner conducting bars, and in which a double gripper device is employed for each bar. Two cross shafts 4 4 are used, mounted to rotate within blocks 5 loose upon guide rods 6. One of each pair of gripper levers $b$ is mounted on the ends of the cross shafts 4 and swivels therewith, and is formed with quadrant teeth 7 gearing with similar quadrant teeth 8 upon the other gripper lever $b$ which is rotatable upon a stud 9 carried by the block 5. When the cross shafts 4 are rotated by the loaded levers 10 on breakage of the winding rope in manner already described the lower ends of each gripper lever $b$, which ends are formed with saw teeth or a knife edge, are dug into the corner guide bars 11. The levers $b$ are thus secured to the bars 11 and as the lift descends the blocks 5 slide on the rods 6 against the action of springs 12, which springs are not however essential, and the shoe or wedge piece 13 forces the upper ends of the levers $b$ still farther apart to effectually bind the gripper devices to the guide bars 11 and arrest the further descent of the cage.

We declare that what we claim is.

1. Safety devices or arresters for colliery winding cages, hoists or the like, consisting in combination, of guides carried by the cage, blocks slidable in said guides, levers pivoted to the blocks, gripping appliances carried by the said levers, guides for the cage or hoist, cage suspension means, means to actuate the levers to cause such appliances to grip and be secured to the last named guides on the failure of the cage suspension means, and means, carried by the cage, to act upon the levers to cause the gripping appliances to exert a powerful grip upon said guides to bring the cage to a standstill almost simultaneously with the breakage of the suspension means, substantially as described.

2. A gripping device or safety appliance for colliery winding cages, comprising, in combination, guides, carried by the cage, blocks slidable in said guides, levers, pivoted to the blocks, grippers carried by the said levers, guides for the cage, cage suspension means, loaded pivoted levers connected operatively with the first named pivoted levers, means connecting the said loaded levers with the cage suspension means to maintain the former in inoperative position during slight slackening of the suspension means but which will actuate the first named pivoted levers to cause the grippers to bind upon the last named guides in the event of breakage of the suspension means to arrest the gripping device, means carried by the cage to act upon the pivoted levers to cause the grippers to be jammed onto said guides by the entire weight of the cage and load, substantially as described.

3. An improved safety appliance for colliery winding cages comprising grippers, a pair of levers carrying said grippers, the levers in each pair being connected together by toothed gearing, blocks to which each pair of levers are pivoted, guides carried by the cage on which such blocks are slidable, guides for the cage, cage suspension means, loaded pivoted levers connected to the cage suspension means and capable of swaying inoperatively with the slack in such means in the ordinary working of the cage, but adapted to actuate all the pairs of pivoted levers synchronously on the failure of the cage suspension means to actuate the grippers to cause them to grip upon and be secured to the guides for the cage, means carried by the cage to act upon the pivoted levers and bind the grippers upon the guides for the cage with the entire weight of the cage and contents so as to immediately arrest the descent of the cage and securely suspend it upon the guides for the cage, substantially as described and shown.

4. A safety device or arrester for lifts, hoists or the like, consisting, in combination, of guides carried by the lift, blocks slidable in said guides, levers pivoted on said blocks, grippers carried by said levers, guide bars for the lift, lift suspension means, means for locking the pivoted levers to the guide bars of the lift on failure of the suspension means and means carried by the lift for wedging the pivoted levers securely to the guide bars to arrest the descent of the lift, substantially as described.

In testimony whereof we have signed our names to this specification in the presence of two subscribing witnesses.

JACK YATES.
CHARLES HEYES.

Witnesses:
JOSHUA ENTWISLE,
NORMAN KIERNAN.

Copies of this patent may be obtained for five cents each, by addressing the "Commissioner of Patents, Washington, D. C."